United States Patent Office 3,840,497
Patented Oct. 8, 1974

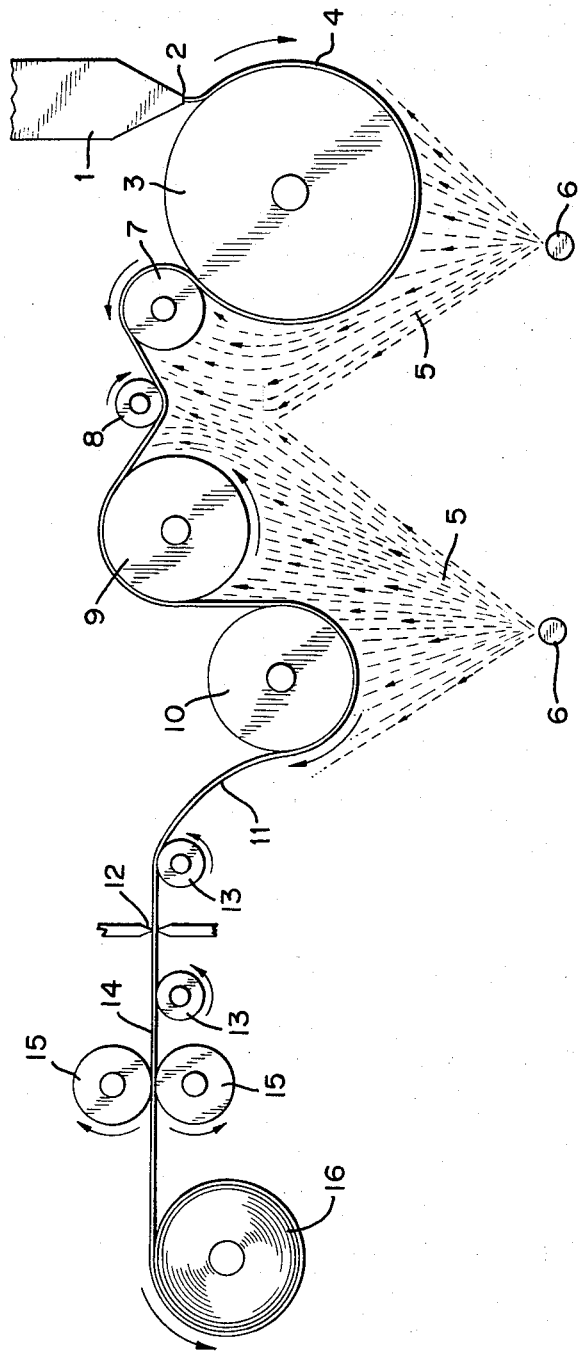

3,840,497
POLYCAPROLACTAM FILM FOR COOKING BAG
Frank Gondorchin, St. Clair, Pa., and Julian H. Kushnick, Brooklyn, N.Y., assignors to Allied Chemical Corporation, New York, N.Y.
Filed Dec. 23, 1971, Ser. No. 215,958
Int. Cl. C08g 20/38
U.S. Cl. 260—78 S                2 Claims

ABSTRACT OF THE DISCLOSURE

Nylon film and a process for making the same comprising forming a coherent film by extruding a molten polyamide resin at a temperature above its melting point onto a first smooth moving support maintained at a surface temperature in the range of about 180° F. to about 250° F. and passing the film about a second moving support maintained at a surface temperature in the range of about 235° F. to about 265° F. In a preferred embodiment, the film is passed about an additional moving support prior to being advanced to the second moving support. This additional moving support is maintained at a surface temperature in the range of about 210° F. to about 270° F. The film is subsequently collected on suitable means. The resultant nylon film has a haze value in the range of 4.0% to 6.0% and has an elongation after heat aging of at least 30%. The film is particularly suitable for the manufacture of cook-in-bags.

---

This invention relates to nylon film which is particularly suitable for forming cooking bags, to bags made from the film, to a process of making the film and to a process for making the bags.

SUMMARY OF THE INVENTION

Nylon film is produced in accordance with this invention by a process which comprises forming a coherent film by extruding a molten polyamide resin at a temperature above its melting point onto a first smooth moving support maintained at a surface temperature in the range of about 180° F. to about 250° F. and passing the film about a second moving support maintained at a surface temperature in the range of about 235° F. to about 265° F. In a preferred embodiment, the film is passed about an additional moving support prior to being advanced to the second moving support. This additional moving support is maintained at a surface temperature in the range of about 210° F. to about 270° F. The film is subsequently collected on suitable means. The resultant nylon film has a haze value in the range of 4.0% to 6.0% and has an elongation after heat aging of at least 30%. The film is particularly suitable for the manufacture of cook-in-bags.

BRIEF DESCRIPTION OF THE DRAWINGS

The sole figure of the drawings is a diagrammatic view of one form of apparatus useful in carrying out the process of this invention.

DESCRIPTION OF THE PREFERRED EMBODIMENT

Nylon film is produced in accordance with this invention on conventional extruding apparatus by a process which comprises maintaining the surface of the moving supports within prescribed temperature limits.

The polyamide resins useful in the process of the instant invention to form films may be derived by methods well-known in the art. Typical methods for preparation of these nylon resins include the self-condensation of amino acids, reaction of diamines with dicarboxylic acids or by the thermal polymerization of epsilon caprolactam. Particularly suitable nylons are those prepared by the intramolecular polymerization of the lactam of epsilon-aminocaproic acid and those obtained from the condensation of hexamethylenediamine and adipic acid. The preferred nylon resin is polyepsilon caprolactam. The polyamide resins suitable for melt extrusion in the present process normally have a "viscosity-average" molecular weight of at least 10,000, preferably between 15,000 and 40,000.

Extrusion of the polyamide resin may be effected by employment of any standard extrusion apparatus. The polyamide resin is generally extruded at temperature of about 15° F. to 200° F. above its melting point. The resin is extruded onto a first smooth moving support or casting surface to form a coherent film. The rate of extrusion, the width of the extruder die orifice and the speed of the moving support may be widely varied and, as is understood by those skilled in the art, determine the thickness of the film. A casting drum, roll or continuous belt or similar means may be conventionally employed to serve as the support. In accordance with the invention, the surface temperature of the first moving support is maintained in the range of about 180° F. to about 250° F., preferably in the range of 225° F. to 245° F. by providing the support with heating means, such as a heat transfer fluid flowing within the interior of the support, which fluid is maintained at the desired temperature.

Following extrusion on the first moving support, the film is passed about a second moving support which may also comprise a drum, roll or continuous belt or similar means. Heating means, such as described above, is also suitably provided for this moving support to maintain the surface of the second moving support at a temperature of about 235° F. to about 265° F., preferably 245° F. to 260° F., more preferably 245° F. to 255° F.

In a preferred embodiment, the film is passed about an intermediate moving support located between the first and second moving supports. This additional moving support may also comprise a drum, roll or continuous belt or similar means and is also provided with suitable heating means in a manner as described above. The surface temperature of the intermediate moving support is maintained in the range of about 210° F. to about 270° F., preferably 225° F. to 255° F. A three moving support system is preferred in order to provide a more controlled cooling of the hot extruded film. That is, for example, a two moving support system requires the second moving support to have a larger circumference than is required in a three moving support system in order to cool the hot extruded film down to the desired temperature and to impart the film with its beneficial properties.

After passing about the second moving support, the film is then wound and collected on suitable collecting means, such as a drum or roll. As is conventional, the edges of the film may be slit to remove any distorted portions prior to being wound up. The film may be produced at a linear speed in the range of about 30 to about 350 feet per minute (f.p.m.), preferably in the approximate range of 100 to 300 f.p.m.

Film produced in accordance with the process of this invention may be of any desired thickness, the preferred thickness being in the approximate range of 0.5 mil to 2 mils.

With reference to the sole figure of the drawings, an apparatus for carrying out a preferred embodiment of the process and producing the film of this invention is shown. In the figure, film die 1 is provided with a die orifice 2 through which the molten resin flows to the surface of a smooth casting drum 3 (first moving support) to form flat film 4. Film 4 passes around a portion of drum 3 and is stripped from drum 3 by stripper roll 7 and passes under idler roll 8 to cooling roll 9 (intermediate moving support). Film 4 passes partially around rotating cooling roll 9 and then partially around rotating second cooling roll 10 (second moving support). The rolls are designated as cooling rolls although their surface temperature may be above that of the casting drum because the film is continuously cooling after exiting from the die. Casting drum 3 and cooling rolls 9 and 10 are provided with internal heating means (not shown) to maintain their respective surface temperatures as desired. The internal heating means may suitably comprise ethylene glycol which is maintained at a temperature approximately equal to the desired surface temperature of the moving support and which is pumped under pressure to the moving supports. The ethylene glycol may typically be passed through a heat transfer unit (not shown) after passing through the interior of the moving support in order to maintain the solution at the proper temperature. Of course, other heating means may be employed to maintain the drum and rolls within the temperature ranges set forth above. The nylon film is exposed to a hot water vapor atmosphere 5 supplied by steam sparge pipes 6 while on drum 3 until removal from cooling roll 10. The number of steam sparge pipes may, of course, be varied as desired. Film 11 is drawn to trim station 12 while being supported by idler rolls 13 to trim away distorted edges of the film. Trimmed film 14 is passed through the nip of contra-rotatable rolls 15 and then to a wind-up roll 16.

Nylon film made in accordance with this invention is particularly suitable for the formation of cooking bags, such as boil-in-bags, bake-in-bags and heat-in-bags. Cooking bags may be formed from rolls of nylon film, for example, by centerfolding the film to provide a fold at one film edge and then passing the centerfolded film through a plastic bag forming apparatus which sequentially forms double seal lines extending across the width of the film at longitudinally spaced intervals and then separates, by cutting, perforating, or similar techniques, the film between each of the double seal lines to provide individual bags.

The film of this invention has a haze level, as measured by ASTM D–1003, of between 4.0% and 6.0%. It has been found that such film has the requisite processing characteristics to be utilized in bag making machinery and has desirable properties in the form of a bag. Within the above haze range, the film possesses a desirable balance of "blocking" and "slipping" ("non-blocking") characteristics. That is, the film has sufficient "block" to prevent wrinkling when centerfolded and when advanced in a bag making machine, even at high processing rates, and bags formed from such film have sufficient "slip" characteristics to be readily operable for filling purposes. Moreover, the film can be readily heat sealed and thermoformed.

In addition to the above enumerated advantageous characteristics, it has been unexpectedly found that the film of this invention has a higher elongation after heat aging than has conventional polyepsilon caprolactam film. This is especially significant when bags formed from this film are used as bake-in-bags or heat-in-bags because the bags are less likely to rupture, collapse or split open ("shatter") during cooking or after removal from the oven.

The film of this invention has a maximum elongation in the machine direction (as measured by ASTM D–882) after aging at 350° F. for 40 minutes of at least 30% and preferably at least 50%.

The following examples illustrate specific applications of the above-described process. It is to be understood that the examples are for the purpose of illustration only and that the invention is not to be regarded as limited in any manner to the specific conditions or apparatus cited therein.

EXAMPLE 1

A sample of molten polyepsilon caprolactam nylon resin having a "viscosity-average" molecular weight of 20,000 to 22,000 is formed into film by use of the apparatus shown in the figure. The molten resin is extruded at a temperature of 518° F. through a die orifice measuring 52" by 0.018" of a standard screw extruder. The molten resin is quenched to a coherent film by being drawn downward onto a rotating 18" diameter chromium plated steel drum which is maintained at a surface temperature of 226° F. The die orifice is located approximately ¼" between the drum and the opening of the die orifice, and the drum is heated and its surface temperature is maintained by continuous application of heated ethylene glycol solution through its interior. The drum is rotated at a peripheral speed sufficient to draw the melt to a thickness of 0.0008". After being stripped from the drum, the 0.8 mil film is passed partially around a rotating first cooling roll maintained at a surface temperature of 235° F. This roll is also heated by the flow of hot ethylene glycol through its interior. The film is then passed partially around a rotating second cooling roll maintained at a surface temperature of 250° F. by similar heating means. The film is then advanced to a trimming station where the edges are trimmed and then drawn between a pair of contrarotatable rolls and wound on a wind-up roll. The lineal speed of the film is 151.8 f.p.m.

The film has a haze of 6% as measured by ASTM D–1003 haze test. The film is tested for tensile strength and elongation in the machine direction both at ambient temperature and after heat aging at 350° F. for 40 minutes. Results are listed in Table I under Sample 1.

COMPARATIVE EXAMPLES 2–4

Samples from three rolls of film which are produced from the same resin and on the same type of apparatus as in Example 1 but under different operating conditions are tested for tensile strength and elongation in the machine direction both at ambient temperatures and after heat aging as above. The samples are identified as Samples 2, 3 and 4. Operating conditions and the results of these tests are listed in Table I.

TABLE I

| Sample number | 1 | 2* | 3* | 4* |
|---|---|---|---|---|
| Operating conditions: | | | | |
| Extrusion temp. (° F.) | 518 | 518 | 514 | 513 |
| Casting drum temp. (° F.) | 226 | 222 | 255 | 255 |
| Cooling roll 1 temp. (° F.) | 235 | 228 | 271 | 273 |
| Cooling roll 2 temp. (° F.) | 250 | 228 | 260 | 265 |
| Line speed (f.p.m.) | 151.8 | 146 | NR | NR |
| Film properties: | | | | |
| Thickness (mil) | 0.8 | 0.75 | 0.6 | 0.6 |
| Haze (percent) [1] | 6 | 3 | 12 | 16 |
| Max. tensile strength, MD (p.s.i.): | | | | |
| Ambient | 16,600 | 17,100 | 16,800 | 15,800 |
| After aging [2] | 7,400 | 7,700 | 7,600 | 7,900 |
| Yield point, MD (p.s.i.): | | | | |
| Ambient | 5,700 | 5,400 | 6,200 | 5,600 |
| After aging [2] | 7,800 | 7,700 | 7,600 | 7,900 |
| Max. elongation, MD (percent):[3] | | | | |
| Ambient | 377 | 375 | 381 | 359 |
| After aging [2] | 100 | 35 | <10 | 30 |

[1] Determined by ASTM D–1003.
[2] Aging at 350° F. for 40 minutes.
[3] Determined by ASTM D–882.

* Comparative examples.
NOTE.—NR=not recorded; MD=machine direction.

It can be seen from the above table that Sample 1 has a considerably higher percent elongation after heat aging than comparative Samples 2–4 and that Samples 2–4 fail to meet at least one of the desired elongation and haze properties.

EXAMPLES 5–9

Another series of tests is performed on film made in accordance with this invention produced on apparatus similar to that of Example 1. The haze and elongation properties of these films are listed in Table II.

TABLE II

| Sample number | 5 | 6 | 7 | 8 | 9 |
|---|---|---|---|---|---|
| Operating conditions: | | | | | |
| Casting drum temp. (° F.) | 228 | 227 | 228 | 238 | 229 |
| Cooling roll 1 temp. (° F.) | 246 | 225 | 239 | 267 | 240 |
| Cooling roll 2 temp. (° F.) | 257 | NR | 245 | 264 | 263 |
| Line speed (f.p.m.) | 189.8 | 118 | 190.6 | NR | 143 |
| Film properties: | | | | | |
| Thickness (mil) | 0.8 | 1.0 | 0.8 | 0.8 | 0.8 |
| Haze (percent) [1] | 4.8 | 5.6 | 5.4 | 5.0 | 4.6 |
| Max. elongation, MD (percent): [2] | | | | | |
| Ambient | 465 | 455 | 425 | 455 | 465 |
| After aging (350° F./40 min.) | 70 | 57 | 46 | 52 | 62 |

[1] Determined by ASTM D-1003.
[2] Determined by ASTM D-882.

NOTE.—NR=not recorded; MD=machine direction.

The film of this invention is preferably produced as "flat" film as it has been found that tubular blown film undergoes considerable degradation when heated. Furthermore, flat film generally has a higher gauge uniformity than blown film; this is of particular importance in order to provide acceptable heat seals in the bag forming operations. That is, film having large gauge variations is susceptible to "burn-throughs" during heat sealing or may be inadequately bonded during heat sealing. Flat film, in which gauge variations are minimized, will evidence a lower incidence of these defects. Bags formed from center-folded, heat sealed flat nylon film in accordance with this invention have the further advantage of possessing high resistance to tearing and tear propagation during filling of the bags. The film possesses a high tear and tear propagation resistance in its transverse direction, which coincides with the direction that an item is inserted into a bag formed from such film. As a result, splitting of the bag along its lengthwise direction during insertion of a food or other items, especially items of a large size, will be minimized.

As mentioned above, the film in this invention is particularly suited for forming bags. It should be understood that the film may also be used for variety of other purposes, such as in the packaging and fabricating fields, for example as wrapping of food, paper cartons, chemicals, etc. The film may also be laminated to other plastics (such as polyolefins) for easy sealing.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A cooking bag formed from a film consisting of polyepsilon caprolactam, said film having a haze of between 4.0 and 6.0 percent, as measured by ASTM D-1003, and a maximum elongation in the machine direction after heat aging at 350° F. for 40 minutes of at least 30 percent, as measured by ASTM D-882, said bag being resistant to rupture or collapse during cooking in an oven or after removal therefrom.

2. A cooking bag as claimed in claim 1 wherein said film has a maximum elongation in the machine direction after heat aging at 350° F. for 40 minutes of at least 50 percent.

References Cited

UNITED STATES PATENTS

| 2,473,924 | 6/1949 | Walker | 260—78 S |
| 3,321,455 | 5/1967 | Guillet et al. | 260—78 L |
| 3,449,299 | 6/1969 | Schneider et al. | 260—78 S |
| 3,502,766 | 3/1970 | Tsuruta et al. | 260—78 S |
| 3,510,552 | 5/1970 | Tsuruta et al. | 260—78 S |
| 3,560,606 | 2/1971 | Kuga et al. | 260—78 S |
| 3,632,728 | 1/1972 | Kuga et al. | 260—78 S |
| 3,651,200 | 3/1972 | Kuga et al. | 260—78 S |

FOREIGN PATENTS

| 971,332 | 9/1964 | Great Britain | 260—78 R |

OTHER REFERENCES

Chemical Abstracts, Vol. 61 (1964), p. 2390d, Zobel et al.

Chemical Abstracts, Vol. 67 (1967), p. 10535a, Hiscock.

HAROLD D. ANDERSON, Primary Examiner

U.S. Cl. X.R.

156—331; 161—227; 260—78 A, 78 L; 264—176 R